Figure 1:
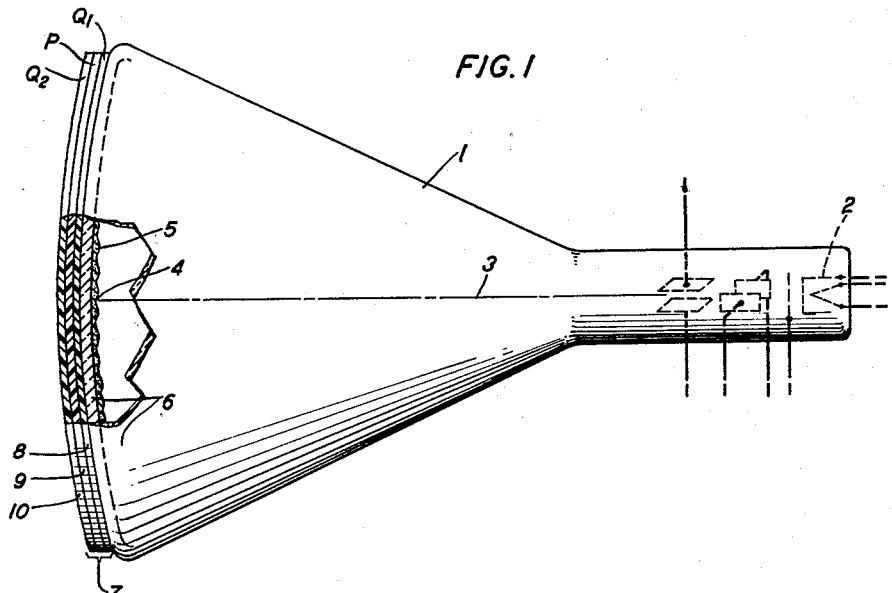

Nov. 1, 1960  D. R. HERRIOTT  2,958,801
CATHODE RAY TUBE CONSTRUCTION
Filed Jan. 13, 1960

INVENTOR
D. R. HERRIOTT
BY
Harry C. Hart
ATTORNEY

2,958,801

CATHODE RAY TUBE CONSTRUCTION

Donald R. Herriott, Morris Township, Morris County, N.J., assignor to Bell Telephone Laboratories, Incorporated, New York, N.Y., a corporation of New York Filed Jan. 13, 1960, Ser. No. 2,231

3 Claims. (Cl. 313—92)

This invention deals with cathode ray tubes. Its object is to improve the contrast and sharpness of the image displayed on the face of such a tube.

A cathode ray tube as envisioned in the present specification comprises an evacuated envelope, usually of glass, having an electron gun at one end and an enlarged transparent face at the other end bearing a layer of a fluorescent material such as a phosphor on its inner surface. A beam of electrons originating in the gun impinges on the phosphor which then emits light from the point of impact. The beam is modulated in strength by control signals and is swept over the phosphor layer in a systematic fashion by deflecting signals. As a result an image, visible through the transparent tube face, is built up point by point. Such a tube forms the central unit of a television receiver, of a radar receiver, and of an oscilloscope for the examination of waves.

The contrast, and hence the sharpness, of the resulting image depend on the size of the phosphor area that is excited or otherwise illuminated. The size of the excited phosphor area is determined by the fineness of the energizing beam. The development of tubes of this sort has reached such a high state of sophistication that it is now possible to direct on the phosphor a high energy electron beam of practically hair-like fineness, so that if the fineness of the beam were the sole controlling factor, the resulting contrast and definition of the image would be of high quality. However, because of the mismatch of refractive indices at the interface between the wall of the tube face and the air outside of the tube, some internal reflection of the light originating in the excited phosphor spot always takes place at the outer surface of the tube wall and the light thus reflected returns to the phosphor and illuminates it at points more or less remote from the excited point. Because light rays are emitted in all directions from the energized spot of the phosphor layer, some of them reach the outer surface of the tube wall at angles that are greater than the critical angle, in which case the internal reflection is complete. The phosphor scatters the light which it thus receives and the illuminated area is seen through the face of the tube as a disc or a ring of light, termed "halation." This halation noticeably reduces the contrast of the resulting image.

The present invention eliminates, or at least greatly diminishes, this contrast-reducing halation. In accordance with the invention in its principal embodiment, a three-component sandwich is placed in optical contact with the exterior surface of the transparent tube face. Each of the three components of the sandwich is composed of a base material having a refractive index that is sensibly equal to the refractive index of the glass of the tube itself, so that no internal reflections no longer take place at the outer surface of the glass tube wall but take place, instead, at the outer surface of the third component of the sandwich. The other properties of the three sandwich components are as follows: the first component and the third are quarter wave plates, while the intervening component is a sheet of light-polarizing material such as that sold under the trade name "Polaroid." The polarizing axis of the polarizer is angularly displaced by 45 degrees from the principal axes of vibration of the two quarter wave plates. With this arrangement, any light ray originating in the impact point of the phosphor which would otherwise be internally reflected at the outer surface of the tube face travels through the first quarter wave plate (which has no visible effect on it because it is randomly polarized to begin with) and through the polarizer. The latter passes components that vibrate in one direction, for example the vertical direction, and blocks those that vibrate in the perpendicular direction, for example the horizontal direction. The polarized light ray emerging from the polarizer continues to travel through the third component of the sandwich, i.e., the second quarter wave plate, to its outer surface and becomes circularly polarized. For ease of description, the ray may be said to have suffered a "twist" of 45 degrees, in its passage. The twisted wave is reflected at the outer surface of the third sandwich component and is returned to the polarizer, being twisted again by the same amount, namely 45 degrees, in its second pass. After these two passes through the third sandwich component the ray is polarized in a direction at right angles to the original direction of polarization, and is thus blocked by the polarizer. It therefore never returns to the phosphor to illuminate it at a point removed from the point of beam impact, and the contrast-reducing halation which originates in such illumination is eliminated.

The foregoing sequence of events would take place with no noticeable difference in the absence of the first quarter wave plate, i.e., the emergent rays pass through it without visible alteration and the returning rays do not reach it. This first quarter wave plate is included in order to reduce undesired reflections in face of the tube originating in spurious light sources outside of it. In the case of such an external source its light, after being unnoticeably rotated by the second quarter wave plate, is polarized by the polarizer and the plane of polarization is twice twisted through 45 degrees: once in the course of the first pass through the first quarter wave plate and again in the course of the second pass so that, being now polarized at right angles to the transmission direction of the polarizer, it is blocked. Thus the three-component sandwich of the invention not only eliminates halations originating in the phosphor but also eliminates undesired reflections from external objects. The second quarter wave plate serves the first purpose and the first quarter wave plate serves the second purpose while the polarizer does double duty, polarizing rays incident from either direction and blocking returning polarized rays arriving from the other direction.

In some cases, for example when the tube is to be viewed exclusively from a completely darkened room, reflections of external light sources in the tube face may cause no problem while the very darkening of the room increases the viewer's susceptibility to the halation effects originating in the phosphor. In this special case the first quarter wave plate may be omitted and the polarizer may be cemented directly to the face of the tube, the second quarter wave plate being cemented to the polarizer. The resulting two-component sandwich constitutes a circular polarizer as before and operates in the fashion described above to eliminate or greatly reduce the contrast-reducing halation.

Figure 2:
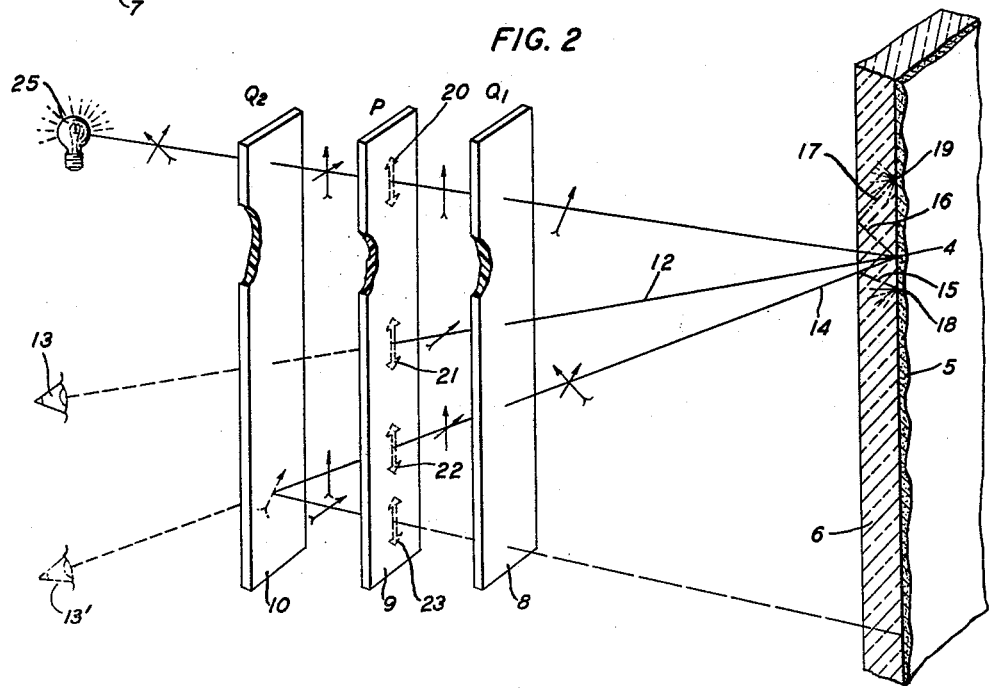

The invention will be fully apprehended from the following detailed description of a preferred embodiment thereof taken in connection with the appended drawing in which:

Fig. 1 is a view, in cross section, of a cathode ray tube constructed in accordance with the invention; and Fig. 2 is an explanatory diagrammatic exploded view of the principal components of the tube face of Fig. 1.

Referring now to the drawing, the cathode ray tube of Fig. 1 comprises an envelope 1 of glass having an electron gun 2 at one end that delivers a sharp, pencil-like beam 3 of electrons to a point 4 of a layer 5 of phosphor that coats the inner surface of the enlarged tube face 6 at the other end. Beam modulating and deflecting electrodes are merely indicated while focusing electrodes, energy sources, control circuits and the like, all well known in the art and unnecessary for the description of the invention, are omitted entirely.

Cemented to the outside surface of the face of the tube is the three-component sandwich 7 of the invention of which the three components are, in order from the standpoint of an emergent light ray, a first quarter wave plate 8, a sheet 9 of "Polaroid" constituting a polarizer and a second quarter wave plate 10. Each of these elements by itself is well known in the art, both from the standpoint of methods of fabrication and from the standpoint of its operation.

In the sandwich 7, these elements are positioned in such a way that the principal axis of each quarter wave plate is angularly displaced by 45 degrees from the polarizing axis of the polaroid sheet. Thus the combination of either quarter wave plate by itself with the polarizer constitutes a circular polarizer. In addition, the base material of which each of the sandwich elements is constructed should have a refractive index equal to that of the glass or other transparent material of which the tube itself is constructed. The three components of the sandwich 7 should be cemented together to provide full optical contact between them, and the sandwich 7 as a whole should be similarly cemented to the face 6 of the tube 1. Canada balsam or any of its more modern counterparts is a suitable cement.

The tube wall 6 with its internal phosphor layer 5 and the three components 8, 9, 10 of the sandwich 7 are shown spaced apart in Fig. 2 for ease of description of the operation. A point 4 of the phosphor 5, impacted by the pencil-like electron beam 3, emits light in all directions. This light is randomly polarized. In some directions, exemplified by the path 12, it travels out through the tube wall 6 and through the first quarter wave plate 8 which gives each of its vibratory components a twist; but because of the random polarization of the emergent light this twist is of no importance. The light continues through the polarizer 9 which passes vibrations in one direction, here shown as the vertical direction. This vertically polarized light is again twisted by the second quarter wave plate. As before the twist is unnoticeable. It then reaches the eye 13 of an observer.

Some of the light originating in the impacted point 4 of the phosphor and radiated outward would, in the absence of the sandwich, follow paths such as 14—15 and 16—17, being internally reflected in the outer face of the tube wall 6 to return to the phosphor 5 and illuminate it at points 18, 19 removed from the impact point 4, thus causing halation. When the sandwich 7 of the invention is cemented to the tube wall, no such internal reflection takes place at the tube face 6. To the contrary, a ray starting along such a path, exemplified by the path 14, continues through the first quarter wave plate 8 to the polarizer 9. The first quarter wave plate, designated "$Q_1$" in the figure, gives each of its components an unnoticeable twist and the polarizer 9, designated "P," whose polarizing axis is indicated by the windows 20—23, blocks the horizontal components. The resulting vertically polarized light passes through the second quarter wave plate 10, designated "$Q_2$," being twisted through 45 degrees on its way, is internally reflected at the outer surface of this, the third sandwich component, and returns through the latter, being twisted again by the same amount. It is now polarized horizontally and is hence blocked by the polarizer 9 so that it never in fact returns to the tube wall 6.

At the same time, light originating in an external source 25 receives an unnoticeable twist from the second quarter wave plate 10, is vertically polarized by the polarizer 9, is twisted through 45 degrees by the first quarter wave plate 8, is reflected from the interior surface of the tube wall 6, and returns along the path 12 and through the first quarter wave plate 8, being again twisted through 45 degrees on its way so that, being now polarized at right angles to the transmission axis of the polarizer 9, it fails to reach the eye 13 of the observer.

What is claimed is:

1. In a cathode ray tube having a transparent wall provided on its inner surface with a screen of fluorescent material and having means for directing a fine stream of electrons upon said screen, thereby to form a minute source of light that is visible from points external to said tube and through said wall, means for preventing undesirable halation effects in the neighborhood of said minute source and for also preventing reflections from said tube wall of light originating in an external source which comprises a three-component sandwich comprising a first quarter wave plate, a polarizer and a second quarter wave plate in mutual optical contact, said first quarter wave plate being in optical contact with the outer surface of said tube wall, the base material of each of said three components having a refractive index approximating that of the material of said tube wall.

2. In a cathode ray tube having a wall of transparent material of refractive index $n$ and provided on its inner surface with a screen of fluorescent material and having means for directing a fine stream of electrons upon said screen, thereby to form a minute source of light that is visible from points external to said tube and through said wall, means for preventing undesirable halation effects in the neighborhood of said minute source and for also preventing reflections from said tube wall of light originating in an external source which comprises a first quarter wave plate having a refractive index $n$ cemented to said wall, a polarizing plate having a refractive index $n$ cemented to said first quarter wave plate, and a second quarter wave plate having a refractive index $n$ cemented to said polarizing plate, said polarizing plate being oriented with its polarizing axis angularly displaced by 45 degrees from the principal axes of vibration of both of said quarter wave plates.

3. In a cathode ray tube having a transparent wall provided on its inner surface with a screen of fluorescent material and having means for directing a fine stream of electrons upon said screen, thereby to form a minute source of light that is visible from points external to said tube and through said wall, means for preventing undesirable halation effects in the neighborhood of said minute source which comprises a polarizing plate fixed with optical cement to said wall, and a quarter wave plate fixed with optical cement to said polarizing plate, said polarizing plate being oriented with its polarizing axis angularly displaced by 45 degrees from the principal axis of vibration of said quarter wave plate, the base materials of said plates and of said cement having refractive indices approximating the refractive index of the material of said tube wall.

References Cited in the file of this patent

UNITED STATES PATENTS 2,734,142    Barnes _____ Feb. 7, 1956